United States Patent
Stuntebeck

(10) Patent No.: US 10,841,113 B2
(45) Date of Patent: Nov. 17, 2020

(54) WORKFLOW AUTOMATION USING NEAR-FIELD COMMUNICATION

(71) Applicant: VMware, Inc., Palo Alto, CA (US)

(72) Inventor: Erich Stuntebeck, Johns Creek, GA (US)

(73) Assignee: VMWARE, INC., Palo Alto, CA (US)

(*) Notice: Subject to any disclaimer, the term of this patent is extended or adjusted under 35 U.S.C. 154(b) by 0 days.

(21) Appl. No.: 16/248,167

(22) Filed: Jan. 15, 2019

(65) Prior Publication Data

US 2020/0228357 A1   Jul. 16, 2020

(51) Int. Cl.
*H04L 12/18* (2006.01)
*G06Q 10/10* (2012.01)
*H04W 8/00* (2009.01)
*H04W 4/80* (2018.01)

(52) U.S. Cl.
CPC ..... *H04L 12/1818* (2013.01); *G06Q 10/1093* (2013.01); *H04L 12/1822* (2013.01); *H04L 12/1831* (2013.01); *H04W 8/005* (2013.01); *H04W 4/80* (2018.02)

(58) Field of Classification Search
CPC ....... H04W 12/06; H04W 4/80; H04W 4/008; H04W 4/04; G06F 16/58; G06F 21/30; A61B 6/4405; A61B 8/585; H04L 63/08; G06K 7/1413; G16H 10/60; G16H 20/10; G16H 40/20; G16H 40/67; G16H 80/00; H04N 7/15; H04N 7/147; H04N 7/181
See application file for complete search history.

(56) References Cited

U.S. PATENT DOCUMENTS

| | | | | |
|---|---|---|---|---|
| 7,492,729 | B2* | 2/2009 | Shaffer | H04L 12/1877 370/260 |
| 8,077,635 | B2* | 12/2011 | Shaffer | H04L 12/1818 370/260 |
| 8,798,252 | B2* | 8/2014 | Krantz | H04L 12/1818 370/260 |
| 9,674,124 | B1* | 6/2017 | Fisher | H04L 51/20 |
| 9,741,020 | B2* | 8/2017 | Min | G06Q 10/1095 |
| 10,027,926 | B1* | 7/2018 | Schirdewahn | H04N 7/181 |
| 2005/0071213 | A1* | 3/2005 | Kumhyr | G06Q 10/0631 705/7.12 |
| 2005/0197877 | A1* | 9/2005 | Kalinoski | G06Q 10/1095 705/7.19 |
| 2006/0015376 | A1* | 1/2006 | Sattler | G06Q 10/06 705/5 |
| 2007/0162315 | A1* | 7/2007 | Hodges | G06Q 10/0631 705/7.12 |

(Continued)

OTHER PUBLICATIONS

"Trigger, Google Play Store," [Online]. Available:https://play.google.com/store/apps/details?id=com.jwsoft.nfcactionlauncher. Last accessed Jan. 15, 2019.

(Continued)

*Primary Examiner* — Sargon N Nano

(74) *Attorney, Agent, or Firm* — Thomas|Horstemyer, LLP

(57) ABSTRACT

Disclosed are various approaches for initiating workflows with respect to physical resource devices on behalf of a user. A physical identifier can be affixed to a physical resource device. An identifier can be embedded within the physical identifier. A workflow application can initiate workflows upon detecting that a user has scanned or captured the identifier.

19 Claims, 6 Drawing Sheets

(56) References Cited

U.S. PATENT DOCUMENTS

| | | | | |
|---|---|---|---|---|
| 2008/0291021 | A1* | 11/2008 | Bhogal | G06Q 10/109 340/572.1 |
| 2009/0055234 | A1* | 2/2009 | Li | G06Q 10/109 705/7.24 |
| 2009/0094533 | A1* | 4/2009 | Bozionek | H04L 67/18 715/753 |
| 2009/0327227 | A1* | 12/2009 | Chakra | H04L 12/1818 |
| 2010/0125353 | A1* | 5/2010 | Petit-Huguenin | H04L 12/1827 700/94 |
| 2012/0293599 | A1* | 11/2012 | Norlin | G06K 9/00221 348/14.01 |
| 2013/0117059 | A1* | 5/2013 | Norton | G06Q 10/06314 705/7.18 |
| 2013/0332513 | A1* | 12/2013 | Honda | H04L 67/42 709/203 |
| 2014/0108084 | A1* | 4/2014 | Bargetzi | G06Q 10/1095 705/7.19 |
| 2014/0239057 | A1* | 8/2014 | Galvin, Jr. | H04L 65/1069 235/375 |
| 2014/0313282 | A1* | 10/2014 | Ma | H04N 7/141 348/14.09 |
| 2014/0344420 | A1* | 11/2014 | Rjeili | H04L 43/04 709/220 |
| 2016/0174064 | A1* | 6/2016 | Brinskele | H04W 8/20 455/414.1 |
| 2017/0054755 | A1* | 2/2017 | Mendiratta | H04L 63/205 |
| 2017/0054768 | A1* | 2/2017 | Smyth | H04L 65/1093 |
| 2017/0279898 | A1* | 9/2017 | Yang | H04L 67/141 |
| 2018/0343290 | A1* | 11/2018 | Gora | G06K 7/1417 |

OTHER PUBLICATIONS

NFC Forum, [Online]. Available: https://nfc-forum.org/. Last accessed Jan. 15, 2019.

Google, "Sharing Files with NFC," [Online]. Available: https://developer.android.com/training/beam-files/index.html. Last accessed Jan. 15, 2019.

M. Weiser, "The Computer for the 21st Century," Scientific American, Sep. 1991.

G. Abowd, "Beyond Weiser: From Ubiquitous to Collective Computing," Computer, Jan. 2016.

R. T. Azuma, "A Survey of Augmented Reality," Presence, Aug. 1997.

Microsoft, "HoloLens," [Online]. Available:https://www.microsoft.com/en-us/hololens.

I. S. M. P. Jukka Riekki, "NFC-Based User Interfaces," in 4th International Workshop on Near Field Communication, 2012.

Microsoft, "Skype for Business Mobile URIs," [Online]. Available: https://msdn.microsoft.com/en-us/skype/skype-for-businessuris/sfbmobileuri. Last accessed Jan. 15, 2019.

Tagstand, [Online]. Available: https://nfctags.tagstand.com. Last accessed Jan. 15, 2019.

HID, "The Power of Choice: From Standard NFC to Secure Solutions," [Online]. Available: https://www.hidglobal.com/sites/default/files/resource_files/hidnfc-tags-and-solutions-wp-en.pdf. Last accessed Jan. 15, 2019.

NXP Semiconductors, "NTAG 213/215/216 Datasheet," [Online]. Available: https://www.nxp.com/docs/en/datasheet/NTAG213_215_216.pdf. Last accessed Jan. 15, 2019.

* cited by examiner

WORKFLOW AUTOMATION USING
NEAR-FIELD COMMUNICATION

BACKGROUND

In today's office environments, smartphones and other devices are becoming more and more ubiquitous and more essential to users. Additionally, in fast-paced office environments, efficient use of resources is important. For example, a business setting might include shared devices such as audio and video conferencing devices, conference display devices, printers, audio-visual setups, or other devices that a user in an office environment might wish to use.

Connecting to and using devices such as these in an office environment can be a cumbersome and often confusing process. In some cases, a user might have to coordinate with information technology personnel to use a display device or conferencing phone in a common area of the office. This can disrupt workflows and cause inefficiencies in a corporate environment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples of systems and methods that initiate workflows in response to a client device capturing a device identifier that is attached to or near a physical device. Physical devices can include audio or video conferencing devices, printers, display devices, or other physical assets that might be located in an office or enterprise environment. Physical devices can be associated with physical resources, such as a room or an area within an office environment. In many office environments, meeting rooms often contain resources for collaboration with others, such as a conference phone or display device. However, connecting to or using these assets in an office environment can be cumbersome. In some cases, a user wishing to use a physical device might have to get assistance from an information technology (IT) administrator to use the device. In other cases, there might be little or no instruction or assistance available for users in the office environment to use these devices.

Many users in an office environment have a smartphone or other device that is enrolled with an enterprise device management service. These devices often have the capability to capture data from an identifying device, such as through a camera or short-range radio capability. An identifying device can include a barcode, a near-field communication (NFC) tag, radio frequency identification (RFID) tag, or other identifier that can be affixed on or near the physical device. A barcode can include a one-dimensional, two-dimensional, or a three-dimensional barcode that can be printed on a placard or sign that identifies the name of a meeting room. The barcode can also be displayed on a display device that is stationed outside or near the meeting room.

A device identifier can be embedded within the identifying device and uniquely identify a physical device or physical resource with respect to other physical devices or resources in the office environment. A user can initiate a workflow associated with a physical resource or a physical device by scanning or capturing the device identifier using an application on his or her smartphone. In the case of a conferencing device, capturing the device identifier can cause the conferencing device to be added to a conferencing event in a conferencing service. In some examples, the conferencing event can be associated with a particular user account linked to the client device. In the case of a display device, capturing the device identifier can cause the client device or another device associated with the user to be connected to the display device. Therefore, examples of the disclosure can streamline the process of using items such as these in an enterprise environment.

Figure 1:
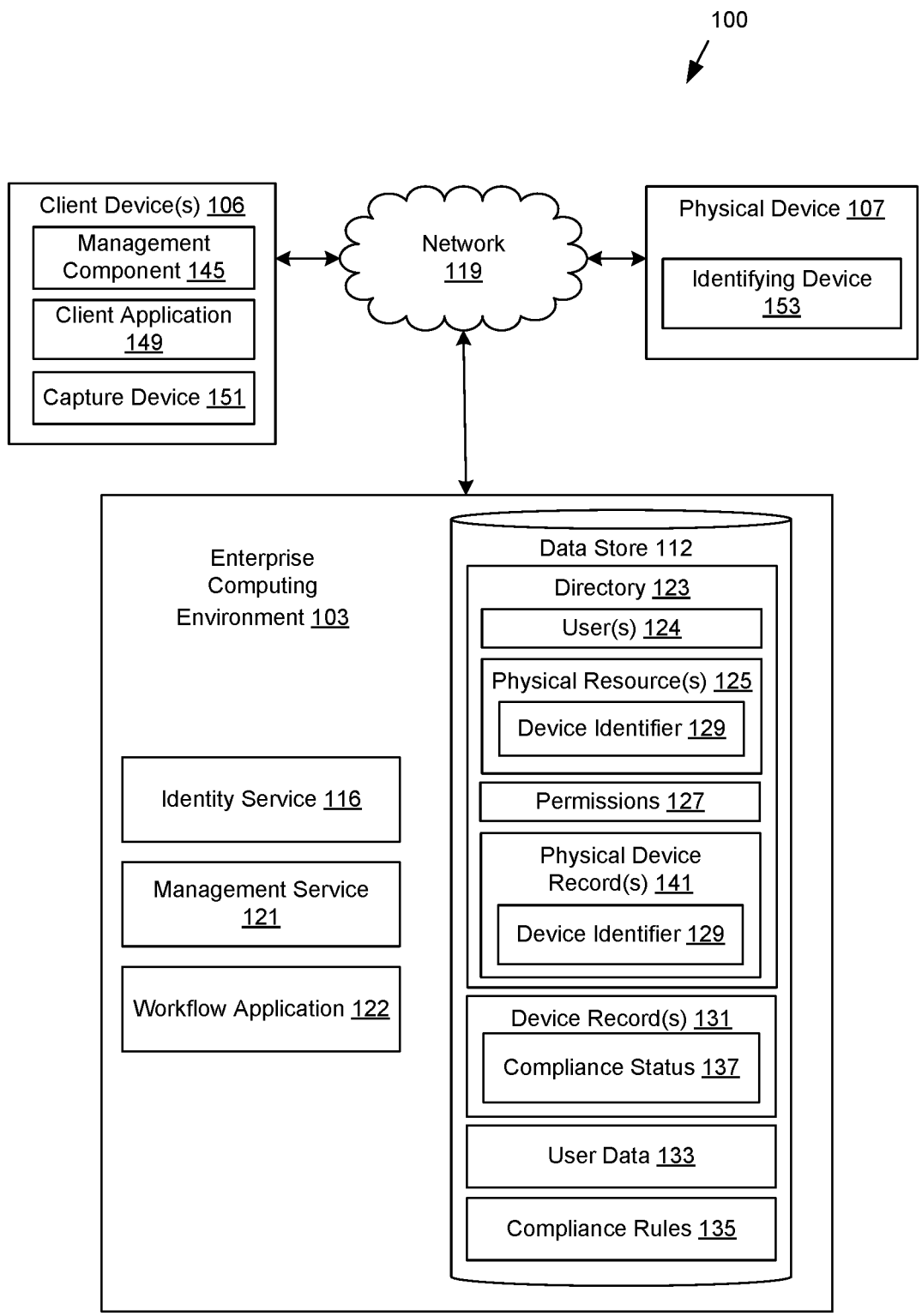
FIG. 1 is a schematic block diagram depicting an example implementation according to various examples of the disclosure.

FIG. 1 illustrates an example of a networked environment 100 according to examples of the disclosure. In the depicted network environment 100, an enterprise computing environment 103 is in communication with at least one client device 106 over a network 119. A physical device 107 can also be coupled to the network, but it is not mandatory that the physical device 107 have capability to communicate over the same network 119 as the enterprise computing environment 103, such as in the case of a conference phone.

The network 119 includes the Internet, intranets, extranets, wide area networks (WANs), local area networks (LANs), wired networks, wireless networks, other suitable networks, or any combination of two or more such networks. The networks can include satellite networks, cable networks, Ethernet networks, and other types of networks.

The enterprise computing environment 103 can be a computing environment that is operated by an enterprise, such as a business or other organization. The enterprise computing environment 103 includes a computing device, such as a server computer, that provides computing capabilities. Alternatively, the enterprise computing environment 103 can employ multiple computing devices that are arranged in one or more server banks or computer banks. In one example, the computing devices can be located in a single installation. In another example, the computing devices for the enterprise computing environment 103 can be distributed among multiple different geographical locations. In one case, the enterprise computing environment 103 include multiple computing devices that together can form a hosted computing resource or a grid computing resource. Additionally, the enterprise computing environment 103 can operate as an elastic computing resource where the allotted capacity of computing-related resources, such as processing resources, network resources, and storage resources, can vary over time. In other examples, the enterprise computing environment 103 can include or be operated as one or more virtualized computer instances that can be executed to perform the functionality that is described herein.

Various applications or other functionality can be executed in the enterprise computing environment 103. Also, various data can be stored in a data store 112 that can be accessible to the enterprise computing environment 103. The data store 112 can be representative of a plurality of data stores 112. The data stored in the data store 112 can be associated with the operation of the various applications or functional entities described below.

The components executed on the enterprise computing environment 103 can include an identity service 116, a management service 121, and other applications, services, processes, systems, engines, or functionality not discussed in detail herein. The identity service 116 and management service 121 can also be executed in separate computing environments. For example, one or both of the management service 121 and identity service 116 can be executed by a third party software-as-a-service (SaaS) vendor environment or in on premise environments. The identity service 116 can operate in cooperation with a directory service such as Microsoft Active Directory® that maintains user information and associates an identity with network resources such as electronic mailboxes, calendars, files, devices, the management service 121, or other resources.

The identity service 116 can comprise a single sign-on service such as Workspace ONE® that authenticates a user's identity for access various hosted and third-party resources. For example, the identity service 116 can authenticate the user's access to her email, a third-party conferencing service provided by a SaaS vendor, or any other service provided by an enterprise to its users. The identity service 116 can perform authentication of users and associates the user's identity with the various resources that are provided within or external a corporate network infrastructure, such as a single sign-on service, email, calendar, contacts, file storage, print services, network access, and others.

In some implementations, devices associated with users in a corporate environment can be managed devices that are enrolled with a management service 121. The management service 121 can be executed by the enterprise computing environment 103 in an on-premise implementation or in another computing environment that is separate from the enterprise computing environment 103. 129

The management service 121 can monitor and oversee the operation of one or more client devices 106 by administrators. In some examples, the management service 121 can represent one or more processes or applications executed by an enterprise mobility management (EMM) provider that facilitates administration of client devices 106 of an enterprise that are enrolled with the EMM provider. To this end, the operating system and application ecosystem associated with the client device 106 can provide various APIs and services that allow client devices 106 to be enrolled as managed devices with the management service 121. The management service 121 can initiate installation of applications as managed applications. The management service 121 can also initiate installation of configuration profiles that can be accessed by certain applications installed on a client device 106.

The management service 121 can include a management console that can allow administrators to manage client devices 106 that are enrolled with the management service 121. User interfaces can allow an administrator to define policies for a user account or client devices 106 associated with an enterprise environment. The user interfaces can also include, for example, presentations of statistics or other information regarding the client devices 106 that can be managed by the management service 121.

The workflow application 122 can obtain an indication that a client device 106 has scanned or captured a device identifier corresponding to a physical resource 125. The workflow application 122 can initiate a workflow in response to receiving the indication. In some cases, the client device 106 can provide a request to add a conferencing device to a conferencing event or a request to connect to a display device corresponding to the device identifier, and the workflow application 122 can initiate the requested workflow. Workflows can be defined according to device type as ordered steps that can be taken on behalf of a user or a particular device. The workflows can be stored in the data store 112 or instrumented into the workflow application 122.

The data stored in the data store 112 associated with the management service 121 and identity service 116 can include a directory 123, device records 131, user data 133, compliance rules 135, and potentially other data. The directory 123 can include the various objects and data structures that are associated with an enterprise directory. Objects within the directory 123 can be organized into data structures, such as forests, trees, domains, organizational units, groups, partitions, or other organizational structures depending upon the directory service 116. Additionally, the directory 123 can be replicated across more than one data store 112 for redundancy purposes. The inner-workings and specific structure of the directory 123 are not shown or discussed herein, as they are not necessary for an understanding of examples of this disclosure. The directory 123 can also be maintained by a directory service that is executed separately from the management service 121 or identity service 116.

Within a directory 123, electronic records or objects corresponding to users 124 or user accounts can be created and stored. A user 124 can correspond to a user having an identity within the identity service 116. Data associated with the user 124 can also be stored in the directory 123 or in locations on a network specified by the directory 123. The data can include an email inbox, calendar data, documents or files, and other data stored by or associated with a particular user 124. In some examples, users 124 can be grouped into user groups by location, job function, or other grouping factors. Additionally, information about the devices assigned to user 124 can also be stored in the directory 123. For example, a user 124 can have a smartphone, a laptop or desktop computer, and other devices that are assigned to the user and that are also enrolled with the management service 121 as managed devices.

In the context of this disclosure, a physical resource 125 can be associated with an electronic record in the directory 123. A physical resource 125 in the directory 123 can correspond to a meeting room, conference room, or other area in an enterprise environment in which physical devices 107 are located. A physical device 107 can comprise a conferencing device, a display device, a meeting room, a conference facility, or another physical resource that can be associated with an identifying device 153, such as a barcode or NFC tag. The electronic record associated with the physical resource 125 can specify a device identifier 129 and potentially other metadata describing the physical resource 125. For example, a meeting room name, location, an identity of physical devices 107 within the room, and other metadata can be stored in the electronic record.

A physical resource 125, in some examples, can also be associated with one or more device identifiers 129. A device identifier 129 can include an email address, username, a URI, UUID, or other identifier that uniquely identifies a physical resource 125 within the directory 123. The device identifier 129 can include or be mapped to a one or more workflows or associated actions that can be initiated when a user scans a corresponding identifying device 153. A workflow can include one or more list of steps or actions that the workflow application 122 can take to facilitate usage of a physical device 107 on behalf of a user.

A physical device 107 can be associated with physical device record 141 in the directory 123. A physical device record 141 can correspond to a conferencing device, a display device, an audio device, a video device, or another physical device that can be associated with an identifying device 153, such as a barcode or NFC tag. The physical device record 141 can specify metadata describing the physical device 107. For example, the physical device record 141 can specify the meeting room with which the physical device 107 is associated, a meeting room name, location, and other metadata can be stored in the electronic record.

For example, the device type, audio capabilities, video capabilities, and other properties of a conferencing device can be stored in the physical device record 141. Additionally, associated actions and workflows that the workflow application 122 can initiate with respect to a physical device 107 or a physical resource 125 on behalf of a user can also be stored in the directory 123.

The data stored in the data store 112 associated with the management service 121 can include physical resources 125, physical device records 141, device records 131, user data 133, compliance rules 135, and potentially other data. Data corresponding to physical resources 125 can include a device identifier 129 that uniquely identifies a physical resource 125 within a directory 123. Additionally, the data store 112 can include other identifying and meta data corresponding to a physical resource 125, such as a location, capacity, and physical devices 107 that are associated with or located within a physical resource 125 such as meeting room within a building. A physical resource 125, in some implementations, can be linked to an identifying device 153 and one or more associated actions that can be executed in response to a user scanning or capturing the identifying device 153 with the capture device 151 of a client device 106. Additionally, data corresponding to a physical resource 125 can identify users or user groups that are permitted to access or utilize the physical resource 125 and physical devices 107 that are associated with the physical resource 125. Additionally, an availability schedule for the physical resource 125 can also be stored in the data store 112.

A physical device record 141 can correspond to a physical device 107 that is associated with a physical resource 125. A physical device record 141 can also be linked to a device identifier 129, which uniquely identifies the physical device 107 with respect to other physical devices 107 in the enterprise. The physical device record 141 can also identify an identifying device 153 that is linked to a physical device 107 corresponding to the physical device record 141. In some scenarios, an identifying device 153 can be linked or affixed to a physical resource 125 such as a conference room.

Device records 131 can correspond to client devices 106 that are enrolled as managed devices with the management service 121. A device record 131 can include various security settings selected for enforcement on a client device 106 that is enrolled with the management service 121. Accordingly, a device record 131 can include a device identifier associated with a device, such as the client device 106, one or more device certificates, a compliance status 137, and other data. In some examples, a device record 131 can also identify a user associated with a particular client device 106. The compliance status 137 can indicate whether a particular client device 106 is in compliance with one or more compliance rules 135.

More specifically, the device record 131 can include one or more of: data describing the identity, type and components of the client device 106; data describing the state of the client device 106; data describing organizational groups to which the client device 106 belongs; data describing compliance rules 135 with which the client device 106 must comply; data describing management policies that specify if, when, and how the client device 106 is permitted to function; and data describing a command queue associated with the client device 106.

For example, data describing the identity, type and components of the client device 106 can specify at least one of more of: a unique identifier associated with the client device 106 (e.g., identifier issued by a manufacturer of the client device or the management service 121), a device type of the client device (e.g., a smartphone, a tablet computing, a laptop computer, a desktop computer, a server computer, or a virtualized instance of any of such computer types), and various software and hardware components of the client device 106 (e.g., operating system [or kernel or bios] type and version, processor type and speed, memory type and size, network interface types, various I/O component types such as camera, touchscreen, keyboard, mouse, printer). More particularly, a device record 131 associated with a client device 106 comprising a network connection television can specify that the client device 106 is a device type of phone, that the client device 106 has an active connection to the Internet, and that the client device 106 has a camera enabled.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 121, whether the client device 106 is in a state of compliance with any applicable compliance rules 135, and whether any remedial actions have been (or are to be) taken as a result of a noncompliance with any applicable compliance rules 135. Also being related to the management of the client device 106, the data describing organizational groups to which the client device 106 belongs can, for example, include any organizational groups of which the client device 106 is a member (by virtue of a static hard coded relationship between the client device 106 and an organizational group, or by virtue of a dynamic evaluation of a membership condition associated with an organizational group, as described later herein).

Further, the device record 131 can include data describing a command queue associated with the client device 106. For example, the management service 121 can maintain a command queue of commands that are designated for execution against the client device 106. As described herein, a client device 106 can be provisioned by the management service 121 by causing resources to be installed or stored on the client device 106. To implement such process, the management service 121 can store a command related to provisioning in the command queue. Additionally, the management service 121 can store a command related to a remedial action associated with a compliance rule 135 in the command queue, in the event that it is determined that a rule condition associated with the compliance rule 125 has occurred. Whether a provisioning command or a command related to a remedial action is stored in the command queue, the client device 106 can retrieve commands stored in its command queue through various ways that are described later herein (e.g., through a client-server "pull system" or through a client-server "push system").

A management command that instructs a client device 106 to connect to a particular display device or launching a particular application to connect to a conferencing service can also be stored in the command queue. In this way, a client device 106 can be instructed as a part of a workflow identified by the workflow application 122 in response to the scanning of an identifying device 153 associated with a physical resource 125.

Finally, data describing compliance rules 135 with which the client device 106 must comply can, for instance, specify one or more security policies to which the client device 106 must adhere, a compliance status 137 of the client device 106, and one or more remedial actions that should be performed in the event that an associated rule condition occurs, as described later herein. In some embodiments, the data describing compliance rules 135 and the data describing management policies 133 are obtained from an organizational record associated with an organizational group 126 to which the client device 106 is a member (i.e., the compliance rules 135 associated with the organizational group 126 are reflected in the device record of the member client device 106).

A compliance status 137 of a client device 106 represents whether the device is in compliance with one or more compliance rules 135. Various compliance rules 135 can be enforced on the client device 106 by the management service 121. Compliance rules 135 can be based on time, geographical location, or device and network properties. For instance, the client device 106 can satisfy a compliance rule 135 when the client device 106 is located within a particular geographic location. The client device 106 can satisfy a compliance rule 135 in other examples when the client device 106 is in communication with a particular local area network, such as a particular local area network that is managed by the computing environment 203. Furthermore, a compliance rule 135 in another example can be based upon the time and date matching specified values.

A compliance rule 135 can specify that a client device 106 is required to be powered off or be in a low power "sleep" state during a specified time period. Another compliance rule 135 can specify that a client device 106 is required to be powered on or be in a normal operation "awake" state during a specified time period. As another example, a compliance rule 135 can specify that a client device 106 is prohibited from rendering content that has been designated as confidential. A compliance rule 135 can also specify whether a camera associated with the client device 106 must be enabled or disabled. The compliance rule 135 can also specify certain times of the day, week, or year in which certain hardware or software features are permitted to be enabled or disabled.

Another example of a compliance rule 135 involves whether a user belongs to a particular user group. For instance, a compliance rule 135 can include a whitelist or a blacklist that specifies whether particular users or groups of users are authorized to perform various functionalities, such as installing or executing a particular application.

Other examples of compliance rules 135 include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule 135 can specify that the client device 106 is required to authenticate a user using a password or personal identification number (PIN) in order to unlock the client device 106.

A compliance rule 135 can also require that the client device 106 has device encryption enabled, where data stored on the device is stored in an encrypted form. The data can be encrypted by a device certificate. A compliance rule 135 can also require that the client device 106 be enrolled with the management service 121 as a managed device. Another compliance rule 135 can specify that the user is required to accept the terms of service that are presented by the management component 145 on the client device 106. As another example, a compliance rule 135 can specify that the management component 145 is required to periodically communicate or "check-in" with the management service 121 to report on its status. If a threshold amount of time has elapsed since the previous check-in of the client device 106, the client device 106 can be considered to have violated this compliance rule 135.

Another compliance rule 135 can specify that a client device 106 run one of a specified variant or version of a particular operating system. A compliance rule 135 can also specify that an enrolled device be manufactured by a particular manufacturer or have a particular manufacturer identifier. Another compliance rule 135 can specify that an enrolled device be a particular model name or model number. A client device 106 can also be considered out of compliance if the device is in a data roaming mode or has used a threshold amount of a periodic network data usage allowance.

A compliance rule 135 can also identify a list of required applications that must be installed on the client device 106 or a list of forbidden applications that cannot be installed on the client device 106. The management component 145 can remove a forbidden application or install a missing required application on the client device 106 in response to detecting a violation of such a compliance rule 135. A compliance rule 135 can also require the presence of a mobile device management (MDM) profile, an MDM storage area, an application profile, and/or a configuration profile. The management component 145 can obtain and store missing required data or containers on the client device 106 in response to detecting a violation of such a compliance rule 135.

Therefore, the compliance status 137 indicates whether and to what extent a particular client device 106 is compliant with compliance rules 135 assigned to the client device 106 by the management service 121. The compliance status 137 can be determined by a management component 145 on the client device 106 that analyzes the status of the client device 106 and reports compliance to the management service 121. In other examples, the compliance status 137 can be determined by the management service 121 based upon state information describing the client device 106, which can be reported by the management component 145. The compliance status 137 can also include the state of various hardware or software features of the client device 106 without respect to whether the status of the features are determined by a compliance rule 135.

Should a client device 106 be out of compliance with one or more compliance rules 135, the workflow application 122 may disallow communication with or usage of a physical device 107 associated with a physical resource 125 in the directory 123.

User data 133 contains information about users who are associated with client devices 106 that are enrolled with the management service 121. User data 133 can include profile information about a user, authentication information about a user, applications that are installed on client devices 106 associated with the user, and other user information. For example, user data 133 can include information about client devices 106 that are associated with a user account of the user, enterprise resources to which a particular user has access, such as email, calendar data, documents, media, applications, network sites, or other resources. The user data 133 can also identify one or more user groups of which a particular user is a member, which can in turn define the access rights of the user to one or more enterprise resources as well as identify which applications should be deployed to a client device 106 associated with the user. To this end, the user data 133 can further identify one or more device identifiers that can uniquely identify client devices 106 that are associated with a user account of the user. In some implementations, some of the user data 133 can be stored by or in locations specified by the directory service 116 rather than in the data store 112 associated with the management service 121.

The client device 106 can represent multiple client devices 106 coupled to the network 119. The client device 106 includes, for example, a processor-based computer system. According to various examples, a client device 106 can be in the form of a desktop computer, a laptop computer, a personal digital assistant, a mobile phone, a smartphone, or a tablet computer system. The client device 106 can represent a device that is owned or issued by the enterprise to a user, or a device that is owned by the user. The client device 106, when provisioned, can be enrolled with the management service 121 as a managed device of the enterprise. In some implementations, the client device 106 can be an unmanaged device that is not enrolled with a management service 121.

In one implementation, the client device 106 can execute a management component 145 that can communicate with the management service 121 to facilitate management of the client device 106. The management component 145 can communicate with the management service 121 to enforce management policies and compliance rules on the client device 106. For example, the management component 145 can enforce data security requirements, install, remove or update security certificates, or write, modify or delete certain data from the client device 106. The management component 145 can also monitor the client device 106, generate state information describing the client device 106, and provide the management service 121 with such state information. For example, the state information can include the network activity of the client device 106, the location of the client device 106, whether enforce password or personal identification number (PIN) authentication is enforced, and/or whether other compliance rules 135 are being complied with by the client device 106. In one example, the state information can be generated by the management component 145 by receiving compliance rules 135 from the management service 121 over the network 119, comparing the state of the client device 106 to the compliance rules 135, and determining whether the client device 106 fails to satisfy the compliance rules 135.

To carry out local management of a client device 106, the management component 145 can be installed and executed with elevated or administrative privileges on the client device 106. In some scenarios, the operating system of the client device 106 can allow a particular application or package to be identified as a device owner or a device administrator, which can in turn configure the client device 106 using such privileges.

The client device 106 can also execute a client application 149. The client application 149 can capture identifying device 153 or physical identifier corresponding to a physical resource 125. The physical identifier can be a barcode, NFC tag, RFID tag, or other form of identifier, that is affixed to or near a physical resource, such as on a conferencing phone, video conferencing device, or a display device. The device identifier 129 corresponding to the physical resource 125 can be embedded within the identifying device. In other examples, the device identifier 129 provided by the identifying device can include a uniform resource identifier (URI) that points to a particular application on the client device 106 or a uniform resource locator (URL) that points to a site or server that is remote from the client device 106. Upon capturing the device identifier 129 from the identifying device, the client application 149 can communicate with the facilitate reservation of the physical resource 125 at a requested time on behalf of a user of the client device 106, as will be described in further detail below. The client device 106 further includes a capture device 151. The capture device 151 can include a camera, NFC reader, RFID reader, or another input device that can capture data from an identifying device.

A physical device 107 can include a device that can house or display an identifying device 153 corresponding to a physical resource. In one example, a barcode in which a device identifier 129 is embedded can be shown on a display of the physical device 107. In another example, an NFC or RFID tag can be embedded within the identifying device 153 so that a capture device 151 can capture data from the identifying device 153 and extract a device identifier 129. An identifying device 153 can also include alphanumeric text that specifies or maps to the device identifier 129, which can be captured by the capture device 151 and recognized through a text recognition capability of the client application 149.

Figure 2:
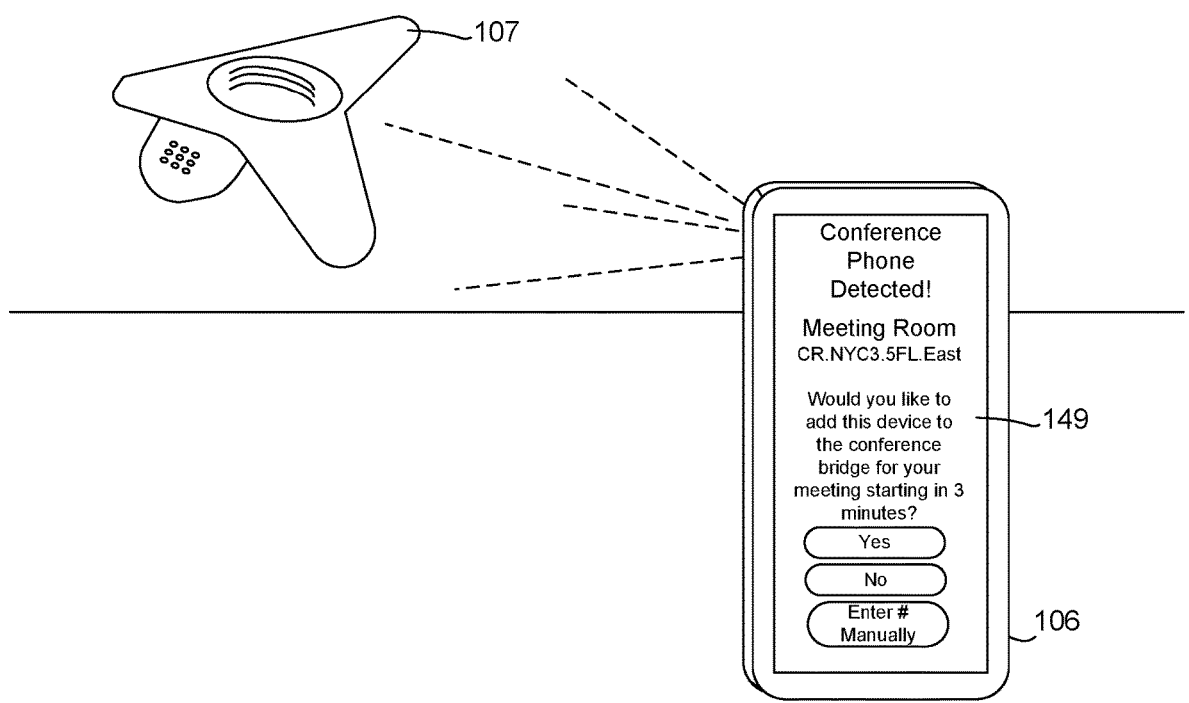
FIGS. 2-3 are example scenarios according to examples of the disclosure.

Referring next to FIG. 2, shown is an example of a client application 149 executed by a client device 106 that can initiate a workflow or set of associated actions that are linked to a physical resource 125. In the example of FIG. 2, a conferencing phone can include an identifying device 153 corresponding to the physical device 107. In one scenario, the user can tap his or her smartphone onto a conferencing phone that has an embedded NFC or RFID tag. The smartphone can act as the client device 106 that has an integrated capture device 151. The identifying device 153 can also include a barcode in which the device identifier 129 is embedded or encoded that the client application 149 can scan.

Accordingly, the user can launch the client application 149 and capture the device identifier 129 as well as other data from the identifying device 153 on the conferencing phone. In some embodiments, the operating system of the client device 106 can launch the client application 149 when the client device 106 captures data from the identifying device 153. In this scenario, the data obtained from the identifying device 1523 can include a URI that causes the operating system to launch the client application 149.

In response to obtaining the device identifier 129 from the identifying device 153, the client application 129 can query the workflow application 122 for information about the physical device 107. The query can include the device identifier 129. The workflow application 122 can reply to the client application 129 with information about the conferencing device that is obtained from the directory 123. The information can include a device type, information about which application or operating system feature on the client device 106 can interact with the conferencing device 107, and a location of the conferencing device. In one scenario, the client application 149 can receive information about the conferencing device from the workflow application 122 and launch a conferencing application on the client device 106 that enables user to add the conferencing device to a conferencing event with a conferencing service.

In another example, the workflow application 122 can receive the device identifier 129 and an indication of a user identity linked to the client device 106. The workflow application 122 can then create a conferencing event within a conferencing service that is executed remotely from the client device 106, such as a SaaS-based or an on-premise conferencing service. The workflow application 122 can access an account of the user in the conferencing service by coordinating with the identity service 121 and the directory 123 to utilize the user's credentials in the conferencing service. In one example, the workflow application 122 can redirect the client application 149 to the identity service 121 to provide or confirm his or her identity in the conferencing service. In some cases, the user might be required to authorize the workflow application 122 to access the user's account within the conferencing service. In some implementations, the workflow application 122 can cache an authentication token or certificate that permits the workflow application 122 to access a user's account within the conference service.

The workflow application 122 can then cause the conferencing service to add the conference phone to the conferencing event, which can result in the conferencing service initiating a voice call with the conference phone. The user can answer the call on the conferencing phone, and as a result, the conference phone is added to a conferencing event after a tap on the device with the user's smartphone and then the user answering a call that is made by the conferencing service to the conference phone. The workflow application 122 can communicate with the conferencing service using an application programming interface (API) through which the workflow application 122 can take actions within the conferencing service on behalf of a particular user account.

In some implementations, the client application 149 can allow the user to cancel the adding of the conference phone to a conferencing event or enter another number that can be adding to a conferencing event created within the conferencing service. The scenario shown in FIG. 2 can also be applied to videoconferencing devices as well as conference phones. In a videoconferencing scenario, the user can tap his or her smartphone to a NFC tag located on or in proximity to a videoconferencing device. In response, the client application 149 can send the device identifier 129 to the workflow application 122, which can initiate a workflow to add the videoconferencing device to a conferencing event in a conferencing service. Similar to the conference phone scenario, the workflow application 122 can create a conferencing event within the conferencing service and initiate a videoconferencing session or call that adds the videoconferencing device to the created conferencing event.

In either scenario the workflow application 122 can also communicate with the conferencing service, or a calendar or email service that stores the user's calendar to determine if an existing conferencing event has already been created by the user for the current time or in the near future, such as within a configurable number of minutes from the current time. If the workflow application 122 determines that an existing conferencing event has already been created within the conferencing service and is associated with the user's account, the workflow application 122 can communicate with an API of the conferencing server to add the physical device 107 to the conferencing event. The physical device 107 can be added to the conferencing event by calling a particular a dial-in number associated with the event or following a uniform resource locator (URL) associated with the event in the conferencing service.

In another scenario, the user can launch the client application 149 and capture a device identifier 129 as well as other data from the identifying device 153 that is associated with a physical resource 125 such as the room in which the conferencing phone is located. In this scenario, the client application 149 can communicate with the workflow application 122 to determine if the physical resource 125 is available for use by the user. The workflow application 122 can determine if the physical resource 125 is available by determining if a calendar or schedule associated with the physical resource 125 indicates that it is not presently booked or reserved by another user. The workflow application 122 can determine if permissions 127 associated with the physical resource 125 indicate that the user associated with the client application 149 is eligible to reserve or book the physical resource 125. As one example, certain rooms or facilities within an enterprise might only be available to certain users or user groups. In one scenario, the workflow application 122 can verify whether a location of the client device 106 on which the client application 149 is executing is in a permitted location to reserve the physical resource 125. A physical resource 125 can be associated with a rule that specified that If the calendar or schedule associated with the physical resource 125 indicates that it is presently available to be reserved by the user, the workflow application 122 can transmit an indication that the physical resource 125 is available to the client application 149, which can display a user interface that requests the user to specify a duration of an event or meeting for which they require the physical resource 125. In response to user input, the client application 149 can transmit a specified duration and/or date for booking the physical resource 125 to the workflow application 122, which can initiate one or more actions or workflows that are associated with the physical resource 125 and/or the physical devices 107 that are located within the physical resource 125.

In one implementation, upon receiving a requested duration for reserving a physical resource 125, the workflow application 122 can create an event or appointment on a calendar associated with a user of the client device 106 or a user on whose behalf the physical resource 125 is being reserved. If the user's calendar has a conflicting event at the present time or over the requested duration, the workflow application 122 can return an error to the client application 149 which can display the error to the user. In this way, the workflow application 122 can also prevent users from reserving multiple physical resources 125 at once or using multiple physical devices 107 that are in different rooms at once. In some implementations, a user can be permitted to override such an error.

Figure 3:
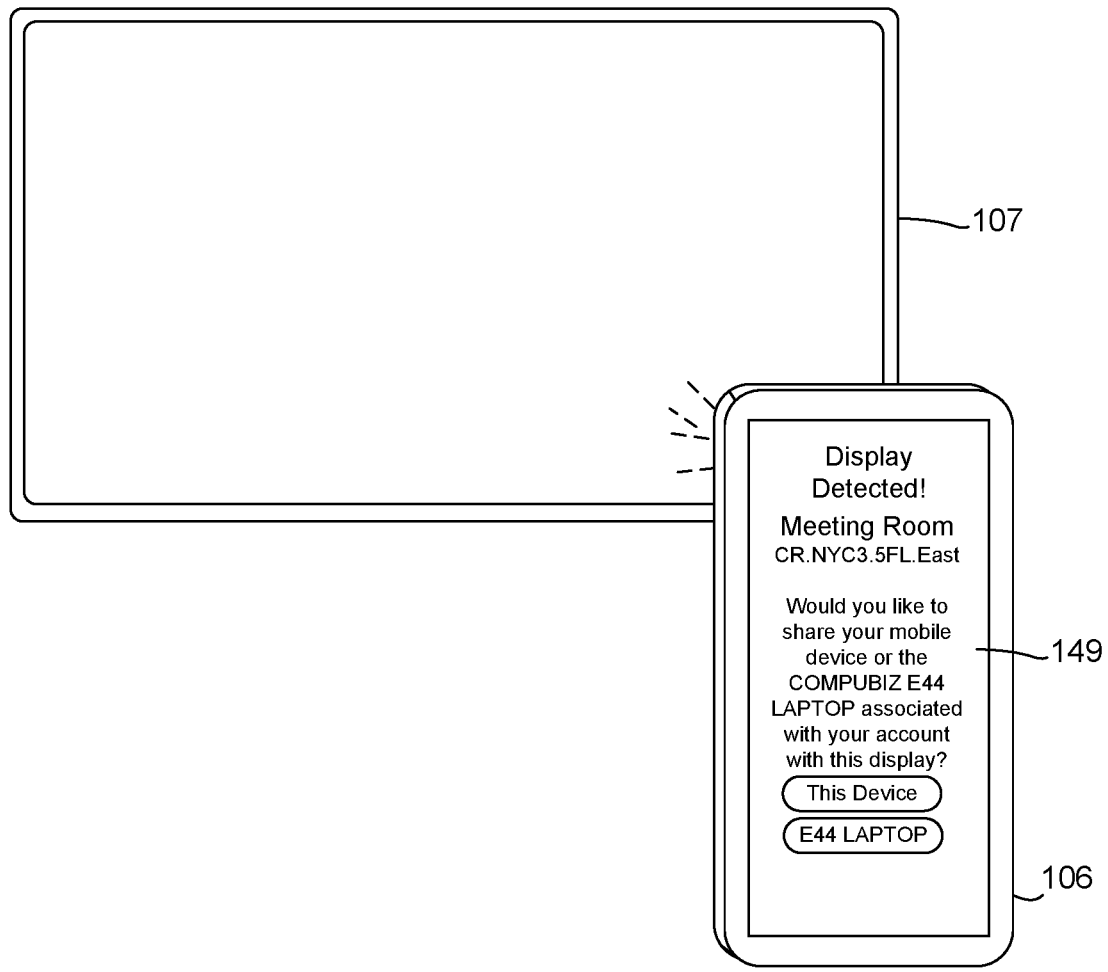

Referring next to FIG. 3, shown is an example of a client application 149 executed by a client device 106 that can initiate a workflow or set of associated actions that are linked to a physical resource 125. In the example of FIG. 3, a physical device 107, a display device, can include an identifying device 153 corresponding to the physical resource 125. In one scenario, the user can tap his or her smartphone onto a display device that has an embedded NFC or RFID tag. The smartphone can act as the client device 106 that has an integrated capture device 151. The identifying device 153 can also include a barcode in which the device identifier 129 is embedded or encoded that the client application 149 can scan.

Accordingly, the user can launch the client application 149 and capture the device identifier 129 as well as other data from the identifying device 153 on the conferencing phone. In some embodiments, the operating system of the client device 106 can launch the client application 149 when the client device 106 captures data from the identifying device 153. In this scenario, the data obtained from the identifying device 153 can include a URI that causes the operating system to launch the client application 149.

In response to obtaining the device identifier 129 from the identifying device 153, the client application 129 can query the workflow application 122 for information about the physical device 107. The query can include the device identifier 129. The workflow application 122 can reply to the client application 129 with information about the conferencing device that is obtained from the directory 123. The information can include a device type, information about which application or operating system feature on the client device 106 can interact with the display device, and a location of the display device. In one scenario, the client application 149 can receive information about the display device from the workflow application 122 and launch an application on the client device 106 that enables user to share the display of the client device 106 with the display device.

In another example, the workflow application 122 can receive the device identifier 129 and an indication of a user identity linked to the client device 106. The workflow application 122 can then identity other devices, such as a laptop computer or PC, that are associated with the user's account. In some instances, these other devices can be enrolled as managed devices with the management service 121 along with the client device 106. The workflow application 122 can provide information about these other devices to the client application 149 so that the client application 149 can provide an option to the user of using these other devices to connect to the display device, as is shown in FIG. 3.

To connect the client device 106 or another device to the display device, the workflow application 122 can cause the management service 121 to send a management command to the device that instructs the management component 145 to add the display device as a second display or mirror its display with the display device. The workflow application 122 can communicate with the management service 121 using an application programming interface (API) through which management actions can be taken by the workflow application 122.

In some implementations of the disclosure, a client application 149 can initiate a workflow without the user scanning an identifying device 153. Instead, the user, from the client application 149, can select one or more types of devices that are required, and the client application 149 can transmit a request to the workflow application 122 to request physical resources 125 and physical devices 107 that near a location specified by the request. The workflow application 122, in response, can identify one or more available rooms with the requested physical devices 107 that are currently available, or are available in the near future. The workflow application 122 can provide an indication of the physical resources 125 and physical devices 107 to the client application 149, which can add the physical resources 125 to the user's calendar and initiate reservation of the physical resources 125 on behalf of the user. The client application 149 can also initiate one or more actions or workflows associated with the requested physical devices 107.

In this way, the user can initiate a workflow with respect to physical resources 125 and corresponding physical devices 107 without scanning an identifying device 153. Additionally, based on similarity to past workflows initiated by a user, certain physical resources 125 and physical devices 107 can be suggested to the user by the client application 149 for a particular requested workflow. In one aspect, if a user requests or initiates a particular workflow on a routine basis, certain physical resources 125 or physical devices 107 can be suggested by the client application 149 to be included in a workflow requested by the user. In other words, if a user launches a workflow that occurs around the same time every week and includes other users, the client application 149 or workflow application 122 can suggest adding those users to the workflow or to a calendar entry if that was not initially requested by the user.

Figure 4:
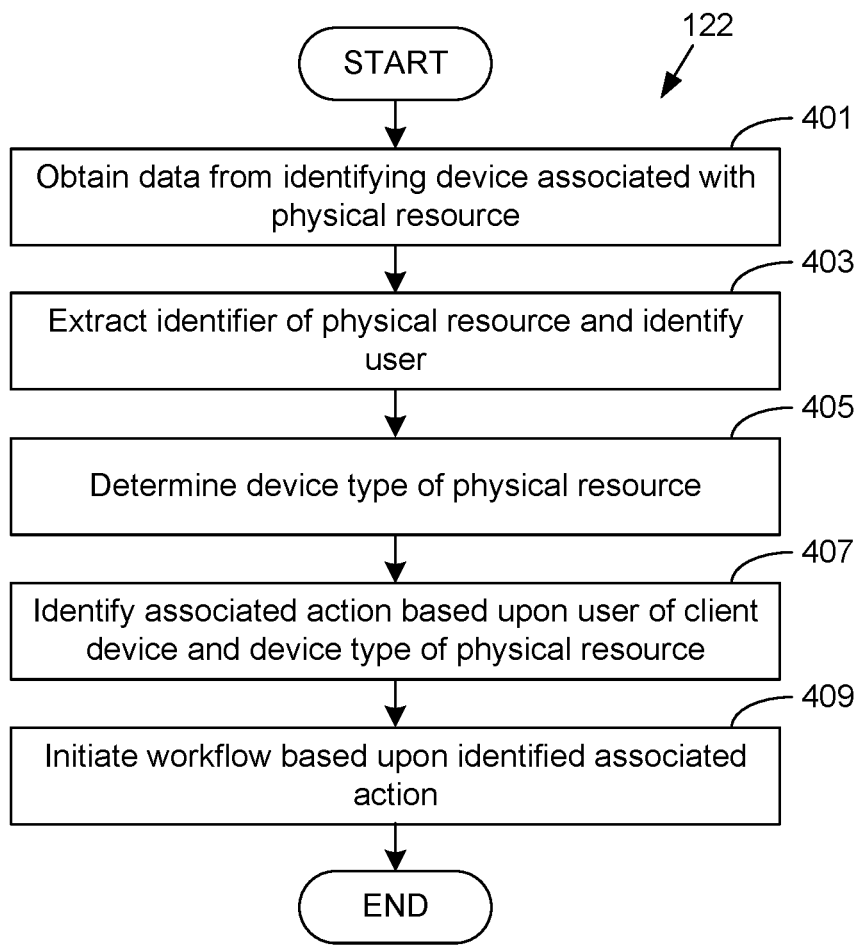
FIGS. 4-6 are flowcharts that illustrate functionality according to examples of the disclosure.

Referring to FIG. 4, shown is a flowchart that provides one example of how the workflow application 122 can initiate a workflow or an associated action that is linked to a physical device 107 or physical resource 125.

Beginning at step 401, the workflow application 122 can obtain data from a client application 149 that is associated with a physical device 107 that has an identifying device 153. As described above, the client application 149 can initiate capture of an identifying device 153 associated with a physical device 107 or physical resource 125. The identifying device 153 can include a barcode, an RFID tag, an NFC tag, or another device that can be affixed on or near a physical device 107. The capture of the physical identifier 153 can be performed by the capture device 151 of the client device 106. In some examples, the client application 149 can also provide a user identifier that identifies the user associated with the client device 106 or the instance of the client application 149.

At step 403, the workflow application 122 can extract a device identifier from the data obtained from the client application 149. The device identifier can be a unique identifier from the physical identifier 153. As noted above, the device identifier 129 corresponds to a physical resource 125 or physical device 107 within the directory 123. The workflow application 122 can also identify a user within the directory 123 corresponding to the user identifier. Identifying the user can enable the workflow application 122 to take actions that are specific to a user account within the directory 123 or within another service with which the user is associated.

At step 405, the workflow application 122 can determine a device type of the physical device 107 scanned by the client application 149 or a device type of physical devices 107 associated with a physical resource 125, such as a conference room, that is scanned by the client application 149. The device type can include, for example, a conference phone, a videoconferencing device, or a display device. By identifying the device type, the workflow application, as discussed below, can identify the appropriate associated actions and workflows that are supported by the physical resource 125.

At step 407, the workflow application 122 can identify an associated action or associated workflow that is available using the physical device 107 or physical resource 125 along with the identified user account. The directory 123 can identify one or more workflows that are available for the physical resource 125 or physical device 107. A workflow stored in the directory 123 can identify a series of actions that can be taken with respect to the physical device 107 or physical resource 125. For example, a workflow can comprise an ordered list of URL's or software actions that the workflow application 122 can call to perform a particular workflow. For example, a workflow for a conference phone can include a first URL that authenticates the user, a second URL that creates an event within a conferencing service, and a third URL to add the conference phone to the conferencing event. The workflow can also include a URL or URI that the workflow application 122 can call to access the user's calendar, which the workflow application 122 can evaluate to determine whether an existing conferencing event is on the user's calendar to which a conferencing phone or other conferencing devices can be added.

As another example, for a display device, a workflow can define the management command that the workflow application 122 can call to cause a client device 106 to share or mirror its display with the display device. An action can also include an API call, a PowerShell command, a phone number to which a call can be initiated or message can be sent, or any other software action or API call.

A workflow associated with a physical resource 125 such as a meeting room or conference facility and also be an ordered list of URL's, URI's, or other software actions that the workflow application 122 can call or execute. The workflow can associate physical devices 107 that are associated with or located within a physical resource 125 with the actions that are linked to the physical resource 125 by the workflow.

At step 409, the workflow application 122 can initiate the workflow based upon the associated actions that are identified in step 407. The workflow application 122 can initiate the workflow by calling the URL's specified in the directory 123 or by communicating with the client application 129 as specified by the workflow identified by the workflow application 122 at step 407. Thereafter, the process can proceed to completion.

Figure 5:
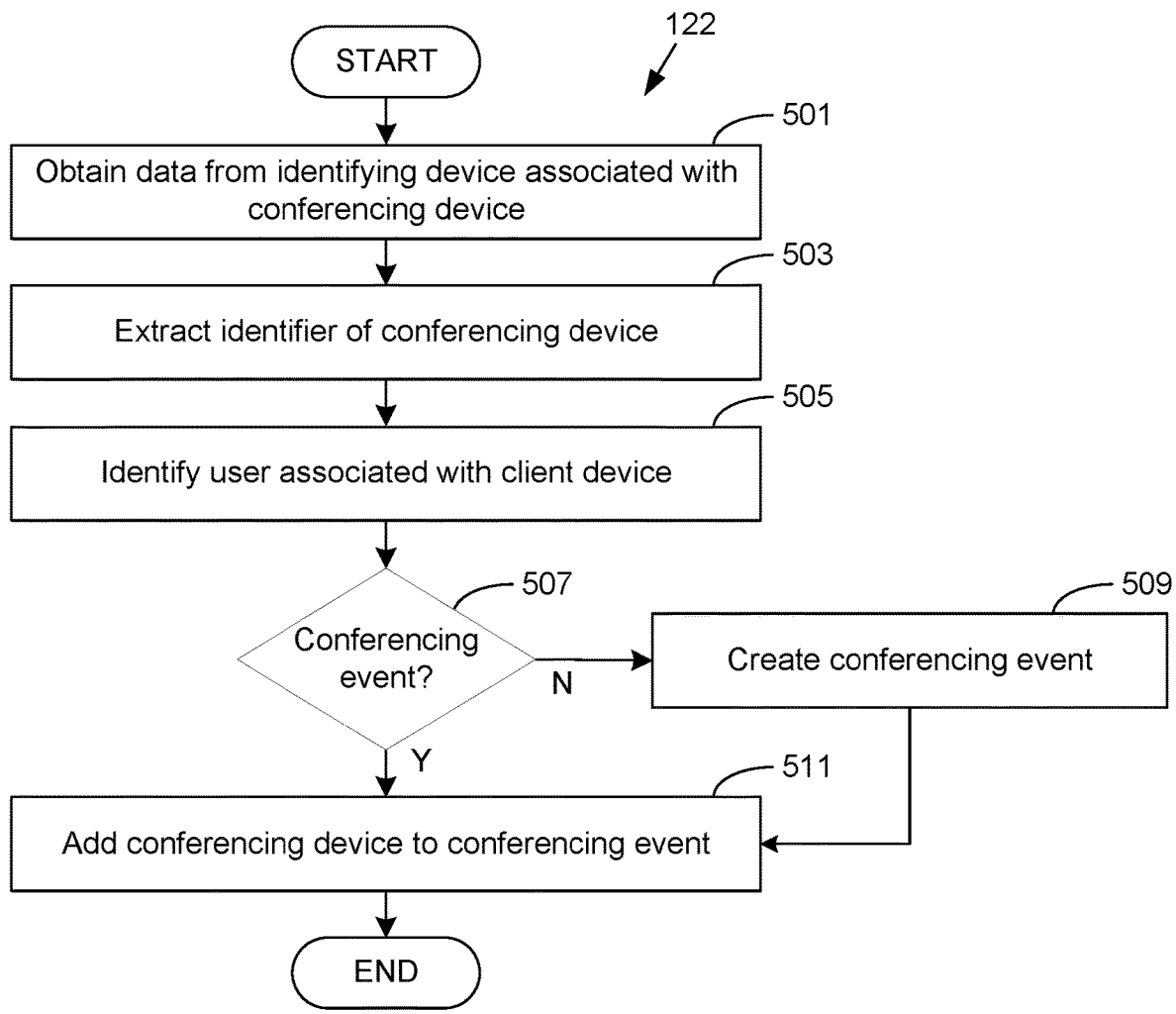

Referring to FIG. 5, shown is a flowchart that provides one example of how the workflow application 122 can initiate a workflow or an associated action that is linked to a conferencing device associated with an identifying device 153 that a user captures with a client device 106.

First, at step 501, the workflow application 122 can obtain data from a client application 149 that is associated with a conferencing device, which can include a conference phone or a videoconferencing device. The conferencing device is associated with an identifying device 153. As described above, the client application 149 can initiate capture of an identifying device 153 associated with the conferencing device. The identifying device 153 can include a barcode, an RFID tag, an NFC tag, or another device that can be affixed on or near a physical device 107. The capture of the physical identifier 153 can be performed by the capture device 151 of the client device 106. In some examples, the client application 149 can also provide a user identifier that identifies the user associated with the client device 106 or the instance of the client application 149.

At step 503, the workflow application 122 can extract a device identifier from the data obtained from the client application 149. The device identifier can be a unique identifier from the identifying device 153. As noted above, the device identifier 129 corresponds to a physical resource 125 within the directory 123. The workflow application 122 can also identify a user within the directory 123 corresponding to the user identifier. Identifying the user can enable the workflow application 122 to take actions that are specific to a user account within the directory 123 or within another service with which the user is associated.

At step 505, the workflow application 122 can determine a user that is associated with the client device 149. Identifying the user can facilitate creation of an event in the user's calendar as well as creation of a conferencing event within a conferencing service on behalf of the user.

At step 507, the workflow application 122 can determine whether a conferencing event exists in a conferencing service or on the user's calendar at the present time or shortly after the present time. If no conferencing event exists, the process can proceed to step 509, where the workflow application 122 can create a conferencing event within the conferencing service on behalf of the identified user. If a conferencing event already exists, the process can proceed from step 507 to 511.

At step 511, the workflow application 122 can add the conferencing device to the conferencing event. The workflow application 122 can utilize an API provided by the conferencing service to create and event and/or add the conferencing device to the conferencing event. To add the conferencing device to the conferencing event, the workflow application 122 can cause the conferencing service to call the conferencing device from a conference bridge or otherwise request the conferencing device to join the conferencing event. The user can complete the addition of the conferencing device to the conferencing event by answering a call or request to initiate a conferencing session on the physical device 107. Thereafter, the process can proceed to completion.

In some examples, the workflow application 122 can verify or confirm whether the location of the client device 106 is in proximity to or consistent with the location of physical device 107 before adding the conferencing device to the conferencing event. The workflow application 122 can obtain the location of the client device 106 by querying the management service 121 for the location of the client device 106. The management component 145 executed by the client device 106 can provide the location of the client device 106 to the management service 121 on a periodic basis or as requested by the management service 121.

Figure 6:
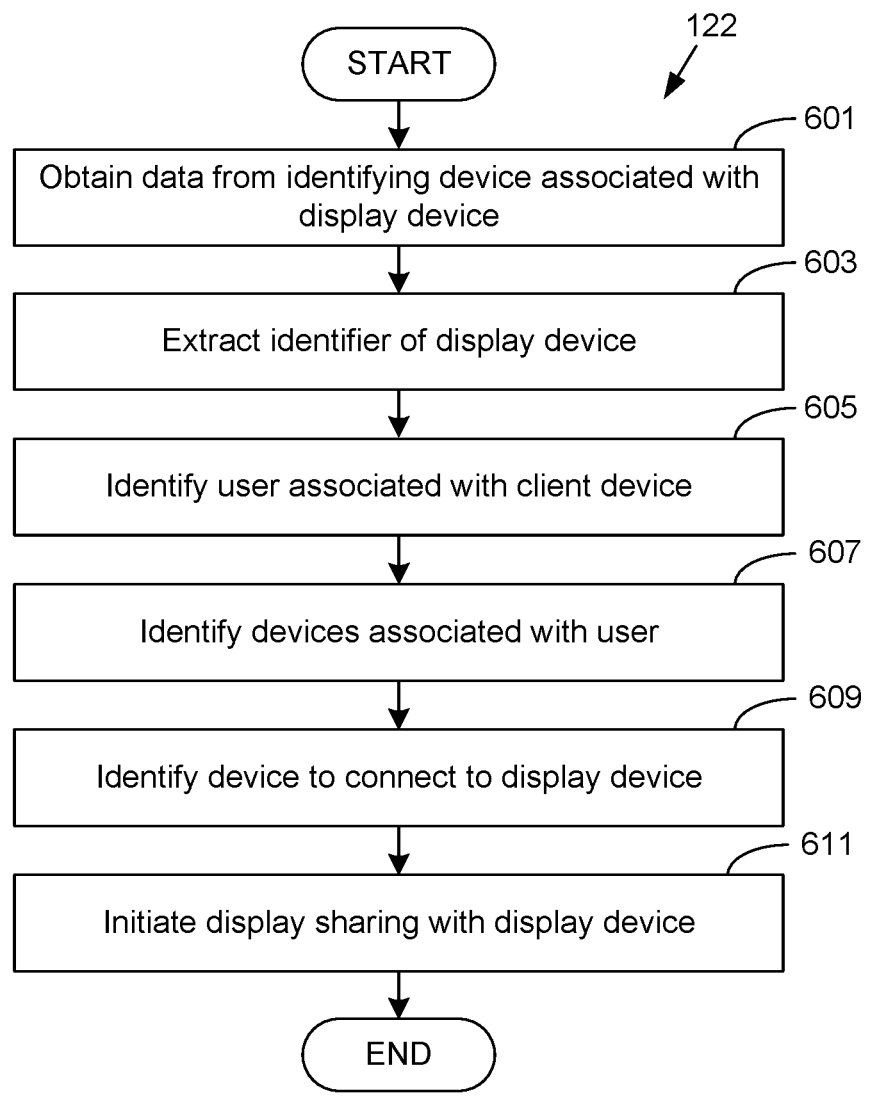

Referring to FIG. 6, shown is a flowchart that provides one example of how the workflow application 122 can initiate a workflow or an associated action that is linked to a display device associated with an identifying device 153 that a user captures with a client device 106.

First, at step 601, the workflow application 122 can obtain data from a client application 149 that is associated with a display device. The display device is associated with an identifying device 153. As described above, the client application 149 can initiate capture of an identifying device 153 associated with the display device. The identifying device 153 can include a barcode, an RFID tag, an NFC tag, or another device that can be affixed on or near a physical device 107. The capture of the physical identifier 153 can be performed by the capture device 151 of the client device 106. In some examples, the client application 149 can also provide a user identifier that identifies the user associated with the client device 106 or the instance of the client application 149.

At step 603, the workflow application 122 can extract a device identifier from the data obtained from the client application 149. The device identifier can be a unique identifier from the identifying device 153. As noted above, the device identifier 129 corresponds to a physical resource 125 within the directory 123. The workflow application 122 can also identify a user within the directory 123 corresponding to the user identifier. Identifying the user can enable the workflow application 122 to take actions that are specific to a user account within the directory 123 or within another service with which the user is associated.

At step 605, the workflow application 122 can determine a user that is associated with the client device 149. Identifying the user can facilitate identification of other devices that are associated with the user that can be shared with the display device.

At step 607, the workflow application 122 can identify the various devices, if there are more than a single device, that are associated with the user. In one example, the workflow application 122 can identify other devices that are assigned to the user in the directory 123 and/or enrolled as managed devices with the management service 121.

At step 609, the workflow application 122 or client application 149 can identify the device associated with the user to connect to the display device. In one example, the device can be identified by obtaining a confirmation or selection of a menu of devices displayed by the client application 149 to the user. The client application 149 can display the devices associated with the user's account by obtaining an indication of the devices from the workflow application 122.

At step 611, the workflow application 122 can initiate display sharing or screen mirroring between the display device and the selected client device 106, whether the selected client device 106 is the user's smartphone, a laptop, or other device identified by the directory 123 or enrolled with the management service 121. In one scenario, the workflow application 122 can identify another device, such as a laptop, that is associated with the user's account and that is also located on a common network as the display device.

In one example, to initiate display sharing, the workflow application 122 can cause the management service 121 to send a management command to the management component 145 that instructs the management component 145 to connect to the display device through a wired or wireless display protocol. The display sharing can be accomplished through a display API that allows the display device to be added as a display of a particular device. The display sharing can also be accomplished by sending the content from a client device 106 or other computing device to the display as a file in part or in its entirety. The file could be sent to a computing device or virtual desktop infrastructure (VDI) session that is already driving the display device or directly to the display in the case of a display that supports a display communication protocol that is supported by the computing device.

In some examples, the workflow application 122 can verify whether the location of the client device 106 is in proximity to the location of the display device before initiating display sharing with the display device. The workflow application 122 can obtain the location of the client device 106 by querying the management service 121 for the location of the client device 106. The management component 145 executed by the client device 106 can provide the location of the client device 106 to the management service 121 on a periodic basis or as requested by the management service 121.

The flowcharts of FIGS. 4-6 show examples of the functionality and operation herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 4-6 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all such variations are within the scope of the present disclosure.

The client device 106, enterprise computing environment 103, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The management service 121, client application 149, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

I claim:

1. A system comprising:
a client device comprising a processor and a memory; and
an application executable by the client device, the application causing the client device to at least:
  initiate capture of an identifier associated with a physical resource, the identifier extracted from an identifying device located in proximity to or on the physical resource;
  determine at least one associated action corresponding to the physical resource based upon at least one of: a device type or a location of the physical resource, the at least one associated action comprising an ordered list of uniform resource locators (URLs) defining a workflow;
  identify a user associated with the client device by utilizing a first URL from the ordered list of URLs at which the user is authenticated; and
  initiate an action associated with the physical resource by accessing a second URL from the ordered list of URLs, wherein the action comprises associating the physical resource with an event in a conferencing service, the second URL adding the physical resource to the event associated with the second URL in the conferencing service.

2. The system of claim 1, wherein the at least one associated action is identified by at least:
  extracting a unique identifier from the identifying device; and
  confirming that a location of the client device is consistent with the location of the physical resource.

3. The system of claim 1, wherein the physical resource comprises a conferencing device, and the application causes the client device to at least:
  identify a calendar event on a calendar associated with the user;
  identify a conferencing service identifier within the calendar event, the conferencing service identifier comprising at least one of: a dial-in number or a uniform resource locator (URL) associated with a conferencing service event; and
  cause the conferencing device to be linked to the conferencing service event.

4. The system of claim 3, wherein the application causes the conferencing device to be linked to the conferencing service event by causing the conferencing service to initiate a voice session with the conferencing device.

5. The system of claim 1, wherein the physical resource comprises a display device, and the application causes the client device to at least:
  connect to the display device using a display application programming interface (API) on the client device; and
  cause content to be displayed on the display device using the display API.

6. The system of claim 1, wherein the physical resource comprises a display device, and the application causes the client device to at least:
  identify a computing device associated with the identity of the user; and
  cause a management command to be sent from a remotely executed management service to the computing device, the management command causing the computing device to initiate a display sharing session with the display device.

7. The system of claim 6, wherein the application identifies the computing device associated with the identity of the user by querying the management service to identify a device associated with an account of the user in a directory service that is connected to a common network relative to the display device.

8. A method for reserving a physical resource associated with an electronic record in a directory service comprising:
  initiating capture of an identifier associated with a physical resource, the identifier extracted from an identifying device located in proximity to or on the physical resource;
  determining an at least one associated action corresponding to the physical resource based upon at least one of: a device type or a location of the physical resource, the at least one associated action comprising an ordered list of uniform resource locators (URLs) defining a workflow;
  identifying a user associated with a client device by utilizing a first URL from the ordered list of URLs at which the user is authenticated; and
  initiating an action associated with the physical resource by accessing a second URL from the ordered list of URLs, wherein the action comprises associating the physical resource with an event in a conferencing service, the second URL adding the physical resource to the event associated with the second URL in the conferencing service.

9. The method of claim 8, wherein identifying the at least one associated action further comprises:
  extracting a unique identifier from the identifying device; and
  confirming that a location of the client device is consistent with the location of the physical resource.

10. The method of claim 8, wherein the physical resource comprises a conferencing device, and the method further comprises:
  identifying a calendar event on a calendar associated with the user;
  identifying a conferencing service identifier within the calendar event, the conferencing service identifier comprising at least one of: a dial-in number or a uniform resource locator (URL) associated with the event in the conferencing service; and
  causing the conferencing device to be linked to the event.

11. The method of claim 10, further comprising causing the conferencing device to be linked to the event by causing the conferencing service to initiate a voice call to the conferencing device.

12. The method of claim 8, wherein the physical resource comprises a display device, and the method further comprises:
  connecting to the display device using a display application programming interface (API) on the client device; and
  causing content to be displayed on the display device using the display API.

13. The method of claim 8, wherein the physical resource comprises a display device, and the method further comprises:
  identifying a computing device associated with the identity of the user; and causing a management command to be sent from a remotely executed management service to the computing device, the management command causing the computing device to initiate a display sharing session with the display device.

14. The method of claim 13, wherein identifying the computing device associated with the identity of the user further comprises:
querying the management service to identify a device associated with an account of the user in a directory service that is connected to a common network relative to the display device.

15. A non-transitory computer-readable medium comprising machine-readable instructions, wherein when executed by a processor of a client device, the machine-readable instructions cause the client device to at least:
initiate capture of an identifier associated with a physical resource, the identifier extracted from an identifying device located in proximity to or on the physical resource;
determine at least one associated action corresponding to the physical resource based upon at least one of: a device type or a location of the physical resource, the at least one associated action comprising an ordered list of uniform resource locators (URLs) defining a workflow;
identify a user associated with the client device by utilizing a first URL from the ordered list of URLs at which the user is authenticated; and
initiate an action associated with the physical resource by accessing a second URL from the ordered list of URLs, wherein the action comprises associating the physical resource with an event in a conferencing service, the second URL adding the physical resource to the event associated with the second URL in the conferencing service.

16. The non-transitory computer-readable medium of claim 14, wherein the at least one associated action is identified by at least:
extracting a unique identifier from the identifying device; and
confirming that a location of the client device is consistent with the location of the physical resource.

17. The non-transitory computer-readable medium of claim 14, wherein the physical resource comprises a conferencing device, and the instructions cause the client device to at least:
identify a calendar event on a calendar associated with the user;
identify a conferencing service identifier within the calendar event, the conferencing service identifier comprising at least one of: a dial-in number or a uniform resource locator (URL) associated with a conferencing service event; and
cause the conferencing device to be linked to the conferencing service event.

18. The non-transitory computer-readable medium of claim 17, wherein the instructions cause the conferencing device to be linked to the conferencing service event by causing the conferencing service to initiate a voice session with the conferencing device.

19. The non-transitory computer-readable medium of claim 14, wherein the physical resource comprises a display device, and the instructions cause the client device to at least:
connect to the display device using a display application programming interface (API) on the client device; and
cause content to be displayed on the display device using the display API.

* * * * *